United States Patent [19]
Casper et al.

[11] Patent Number: 5,817,211
[45] Date of Patent: Oct. 6, 1998

[54] PROCESS AND DEVICE FOR CONTINUOUS EVAPORATION TO DRYNESS OF VISCOUS SOLUTIONS AND SUSPENSIONS WITH A TENDENCY TO STICK

[75] Inventors: Clemens Casper, Krefeld; Dieter Grenner, Leverkusen; Hartmut Hetzel, Köln, all of Germany

[73] Assignee: Bayer Aktiengesellschaft, Leverkusen, Germany

[21] Appl. No.: 760,937

[22] Filed: Dec. 6, 1996

[30] Foreign Application Priority Data

Jan. 10, 1996 [DE] Germany ............................ 19600630.9

[51] Int. Cl.⁶ ..................................................... B01D 1/00
[52] U.S. Cl. .......................... 159/47.1; 159/25.1; 159/28.4
[58] Field of Search .................... 159/47.1, 47.3, 159/25.1, 28.4

[56] References Cited

U.S. PATENT DOCUMENTS

| | | | |
|---|---|---|---|
| 3,550,669 | 12/1970 | Lippert et al. | 159/6 |
| 3,743,539 | 7/1973 | Kroyer et al. | 127/16 |
| 4,430,156 | 2/1984 | Casper et al. | 159/47.1 |
| 4,981,554 | 1/1991 | Loconsolo et al. | 159/6.1 |
| 5,164,030 | 11/1992 | Casper et al. | 159/47.1 |
| 5,183,540 | 2/1993 | Rubin | 203/41 |
| 5,185,060 | 2/1993 | Yamasaki et al. | 159/13.1 |
| 5,256,707 | 10/1993 | Casper et al. | 523/318 |
| 5,268,073 | 12/1993 | Casper et al. | 159/47.1 |

FOREIGN PATENT DOCUMENTS

| | | |
|---|---|---|
| 907418 | 3/1946 | France . |
| 639289 | 11/1983 | Switzerland . |

*Primary Examiner*—Nina Bhat
*Attorney, Agent, or Firm*—Joseph C. Gil; Noland J. Cheung

[57] ABSTRACT

The viscosity of a fluid liquid substance is first increased in a multiphase coil in the presence of a gas phase flowing at high speed and then, with separation of the gas phase, the substance is applied to a stirred bed consisting of a solid granular material where it is converted into a solid substance.

10 Claims, 5 Drawing Sheets

PROCESS AND DEVICE FOR CONTINUOUS EVAPORATION TO DRYNESS OF VISCOUS SOLUTIONS AND SUSPENSIONS WITH A TENDENCY TO STICK

BACKGROUND OF THE INVENTION

The evaporation or concentration of solutions and suspensions is a process step which is frequently used in the chemical, pharmaceutical and foodstuffs industries. Tube-bundle or plate-type heat exchangers are generally used for this process, wherein the solution or suspension flows continuously through the exchangers. Due to the heat input, some of the solvent or the continuous phase of a suspension vaporizes and is isolated at the heat exchanger outlet as vapor. The tube-bundle or plate-type heat exchanger is generally upright and the solution or suspension flows through it from top to bottom.

This type of apparatus is very economical and reliable as long as the solution or suspension has a low viscosity, i.e., it is fluid, and does not tend to stick to the surface of the heat exchanger.

If the solution or suspension is viscous or if so much of the volatile components are extracted from them such that the resulting concentrate is viscous or tends to stick to the surface of the heat exchanger, then this type of apparatus is not suitable. The apparatus only operates in a trouble-free manner when the heat exchanger surfaces are uniformly wetted. If this is not the case, deposits are formed on the heat exchanger surfaces and the apparatus becomes clogged.

If these viscous or sticky solutions or suspensions are intended to be evaporated further, it has to be ensured, by mechanical means, that the heat exchanger surfaces are kept free of deposits and incrustations. This is generally achieved by incorporating rotating wipers or scrapers in the evaporation apparatus, which keep the heat exchanger surfaces free of deposits. If the solution or suspension being evaporated is intended to achieve a pasty or even solid state, only heavy, extensively self-cleaning screw machines are suitable, but these are very expensive and have only relatively low heat transfer coefficients.

U.S. Pat. No. 3,550,669 describes an evaporator in which the mechanical means for keeping the heat exchanger surface clean is not supplied by rotating components, but rather, by the force of the flow. This evaporator consists of only one individual, coiled tube which is heated from the outside. This one-tube evaporator is operated in such a way that the solution or suspension is fed to the apparatus in a superheated state and also under pressure such that some of the volatile constituents in the solution or suspension vaporize in the first section of the apparatus. This vapor takes on the function of transporting the solution or suspension, as it becomes more viscous, through the apparatus and makes sure that the heat exchanger surfaces are kept clean. Thus, the apparatus operates in a self-regulating manner because with the increase of the concentration of the solution or suspension, which leads to increasing viscosity and the tendency to stick, the speed of the vapor, and therefore, the force of the flow, also increases. The heat transfer coefficients which are produced are exceptionally high.

Due to the permanent presence of a liquid and a vapor phase in the apparatus, a multiphase coil (MPC) is present. This MPC works so effectively that the solutions or suspensions being evaporated can be concentrated such that they adopt a doughy or pasty state. Due to the high vapor speeds prevailing in the MPC and the shear forces produced, it is possible to keep the heat exchanger surfaces reliably clean.

Problems arise in the evaporation process when the concentrate/vapor stream of material leaves the MPC and the vapors are isolated. The shear force due to the current of vapor disappears at this moment.

Normally, the MPC opens into a conical container, which may also be designed as a cyclone, in which the concentrate flows downwards and the volatile vapors are drawn upwards.

If the evaporation process is performed under vacuum, the discharge of liquid from the conical container and thus, also the build-up of pressure to atmospheric pressure, is undertaken by a positive-displacement pump, e.g., a gear pump, which is extremely suitable for conveying viscous substances.

The MPC vapor separator system can only function as long as the concentrate flows freely through the gear pump and does not adhere to the walls of the separator. Thus, the rate of evaporation (to produce the same degree of concentration) is not restricted by the evaporator but by the concentrate/vapor separating device, such that the MPC cannot be optimally operated or fully utilized.

Therefore, it has already been proposed that the concentrate and vapor be separated in an apparatus in which the wall surfaces are mechanically cleaned (U.S. Pat. No. 5,256,707). This takes place in a second flow tube with a cross-section of flow which is at least 50 times larger, which is designed either as a rotating tube with a self-cleaning cutter shaft or as a self-cleaning paddle-screw apparatus. These technically complicated machines offer the advantage that the evaporation process can be continued within them, wherein the pasty concentrate can optionally, be concentrated down to dryness. A disadvantage is that the directions of flow of the pasty concentrate or dry substance and that of the vapors, are the same. As a result, there is a risk that particles of substance in liquid or solid form can be swept along by the vapors. The risk is amplified because the rotating components swirl the concentrate particles into the vapor stream. The fact that the entire pasty concentrate is initially applied to the internal surface of the second flow tube and then has to be cleaned off again is regarded as another disadvantage. During the cleaning procedure, in particular, when evaporating down to dryness, granules with very different particle sizes are produced. In particular, very small particles are easily swept along by the vapors.

SUMMARY OF THE INVENTION

It is an objective of this invention to provide a process for the continuous conversion of a fluid liquid substance into a solid substance.

Accordingly, the present invention provides a process for the continuous conversion of a fluid liquid substance into a solid substance comprising:

a) increasing the viscosity of said liquid substance in a multiphase coil in a first stage in the presence of a gas phase flowing at a high speed;

b) converting said liquid substance into a solid substance and isolating said gas phase in a second stage wherein following discharge from the multiphase coil, said liquid substance is applied to a stirred bed comprising a solid granular material, a gas space above said stirred bed having a cross-sectional flow at least 200 times larger than that of said coil; and c) withdrawing said gas phase and said solid substance separately from said gas space and said bed, respectively.

It is also an object of the present invention to provide a device utilizing the above-mentioned process.

DETAILED DESCRIPTION OF THE INVENTION

Figure 1:
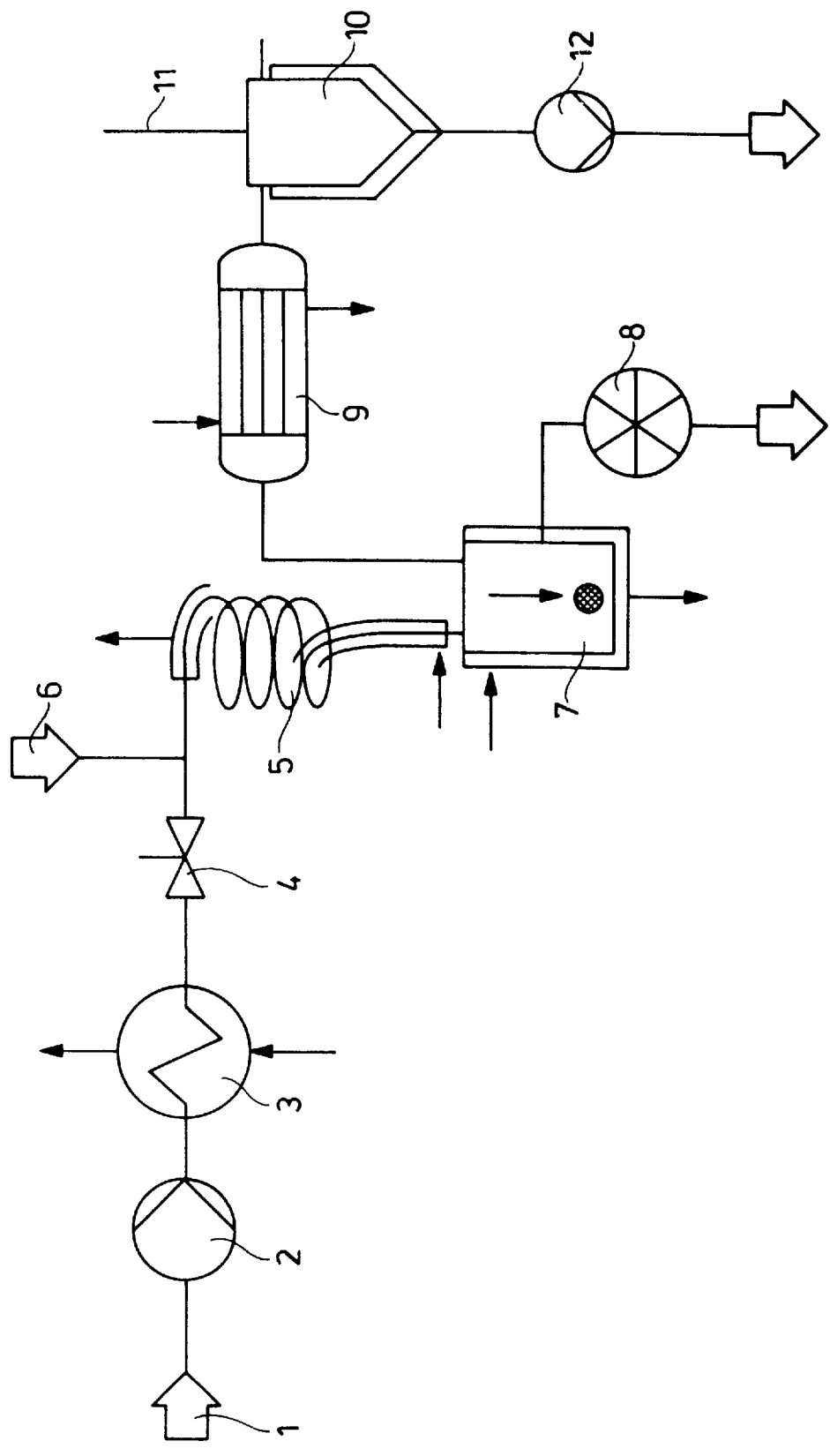
FIG. 1 shows the overall diagram of a plant according to the invention for the evaporation to dryness of solutions and/or suspensions.

The present invention provides a process for the continuous conversion of a fluid liquid substance into a solid substance, wherein the viscosity of the liquid substance in a first stage is increased in a multiphase coil known per se, in the presence of a gas phase flowing at a high speed. In a second stage, the liquid substance is converted into the solid substance and the gas phase is isolated, characterized in that, following discharge from the multiphase coil, the liquid substance is applied to a stirred bed consisting of a solid granular material. The gas space above the stirred bed comprises a cross-section of flow at least 200 times larger than that of the coil, and the gas phase and solid phase are withdrawn separately from the gas space and the bed, respectively. The diameter of the surface of the stirred bed is preferably at least 20 times greater than that of the outlet diameter of the coil.

The stirred bed preferably has a volume, which corresponds to at least 30% of the solid substance produced per hour. Thus, the stirred bed preferably has a depth which is 30 to 70% of the diameter. A cylindrical container in which the height is 80 to 150% of its diameter is most preferably used. The container can be 30 to 70% filled with the solid granular material, wherein the space above the solid granular material forms the gas space into which the multiphase tube opens and in which the gas phase and solid phase are separated with a reduction in the gas speed. The solid substance is withdrawn via a lateral overflow which may be designed in the form of a tube, flange-mounted on the side of the container, the axis being at approximately the same height as that of the top of the solid in the container.

The gas phase is preferably withdrawn via a gas vent tube, mounted on the lid of the container, whose diameter should be chosen to be as large as possible in order to ensure low flow rates for the gas. The diameter of the gas vent tube preferably corresponds to at least 7 times the diameter of the coil.

The axis of the outlet from the coil into the gas space in the container is preferably directed so that it has no directional components in the direction of flow of the gas phase towards the gas vent, i.e., the incoming gas flowing at high speed out of the multiphase coil forms an angle of at least 90° to the main direction of flow in the gas space inside the container. The angle between the admission direction from the multiphase coil and the direction of flow in the gas space is preferably 120° to 180° C.

Furthermore, the direction of the axis of the outlet from the coil is directed towards the surface of the stirred bed, wherein the angle between the axis of the outlet and the surface of the stirred bed may be 45° to 90° C.

The outlet from the coil is positioned sufficiently far above the surface of the stirred bed such that when the incoming jet of gas strikes this, it has lost so much kinetic energy that the surface of the stirred bed is not swirled about too strongly. Additionally, the particles of the still fluid substance with high viscosity carried with the gas stream are not flung toward the wall of the container not covered by the stirred bed.

The stirred bed is preferably circulated by stirrer blades which extend to the wall, are completely covered by the stirred bed, and move the granular material upwards to the edge of the container such that a toroid-like circulation of the stirred bed is produced.

Further parameters for the process according to the invention are produced on the basis of application of the process to specific starting and end products and the conditions under which the fluid liquid substance used can be converted into a solid substance.

The process according to the present invention is preferably used to evaporate solutions and/or suspensions to dryness. Thus, the multiphase coil is heated to a temperature above the vaporization temperature of the solvent or suspension medium, wherein the gas flowing with high speed consists at least partly of the solvent or suspension medium being vaporized in the multiphase coil. In order to achieve the high speed required for transporting the fluid liquid substance in the coil, which also depends on the viscosity of the substance at the outlet of the coil, an inert gas, which may also consist of additional quantities of solvent, may also be fed to the coil. In general, flow rates of gas of 20 to several 100 m per second are required. In particular, flow rates between 50 m per second and the speed of sound are preferred. Further evaporation to dryness takes place after application of the fluid liquid substance with increased viscosity to the stirred bed, which is also maintained at a temperature above the vaporization temperature of the solvent or suspension medium. External jacket heating is sufficient to keep the stirred bed at a constant temperature. Since the bed makes contact with the wall while it is circulated with the production of the toroid-like motion of the granular material, adequate temperature equalization is ensured in the stirred bed.

The solvent or suspension medium may be condensed and recovered after withdrawal from the container.

If the process according to the present invention is used for waste disposal of the dry matter in the fluid liquid substance, an inert material may be initially introduced as the solid granular material for producing the bed, such material also being continuously supplied and acting as a carrier for the dry substance obtained. Preferably, however, a material is used as solid granular material which corresponds to the dry substance being obtained, e.g., dry substance previously produced in accordance with the invention, such that the bed is constantly regenerated without the separate introduction of solid particles.

Preferably, a pressure of less than 1 bar absolute is maintained in the gas space over the stirred bed. In a preferred embodiment, less than 0.03 bar is maintained. In a most preferred embodiment, less than 0.01 bar is maintained. A low pressure of gas in the gas space encourages, in particular, deposition of the viscous particles onto the stirred bed because no high-energy eddy currents, which could possibly entrain viscous particles, can be produced in the gas phase. The solid particles are thus preferably removed via a gas lock which guarantees maintenance of the reduced pressure, e.g., a star wheel valve.

The process according to the present invention, however, is not restricted to the evaporation to dryness of solutions and/or suspensions. On the contrary, it is also possible to perform polymerization reactions with the production of solid granules, with and without the evolution of a gas.

In the case of a plant in accordance with FIG. 1, a suspension or solution is introduced in the direction of arrow 1 with a pump 2 and brought up to a pressure which can be set by means of a restrictor valve, preheated in heat exchanger 3 and introduced into coil 5 via restrictor valve 4 with a decrease in pressure. Optionally, as indicated by arrow 6, an additional amount of inert gas is fed to coil 5. In coil 5, the solution or suspension flows to the wall under the effect of the gas flowing through at high speed, i.e., the optionally already vaporized solvent or suspension medium and the optionally additional gas, wherein more solvent or suspension medium vaporizes due to the good thermal contact between the viscous liquid and the wall of coil 5. Gas bubbles trapped in the viscous liquid are forced out of the viscous liquid due to the prevailing centrifugal forces and any droplets which might become detached are pushed toward the wall again. The largely evaporated viscous and tacky suspension or solution is sprayed onto the stirred bed in stirred container 7, wherein the solution or suspension is evaporated to dryness. The continuously produced dry substance is continuously removed via star wheel valve 8 while maintaining the status of the bed in container 7. The gas phase is taken to a heat exchanger 9, in which the solvent or suspension medium is condensed. The condensed solvent or suspension medium is taken to a cooled receiving tank 10. Non-condensable gaseous constituents, e.g., previously introduced inert gas, are withdrawn via piping 11. The condensed constituents are removed from receiving tank 10 via a pump 12 or a barometric discharge.

Figure 2:
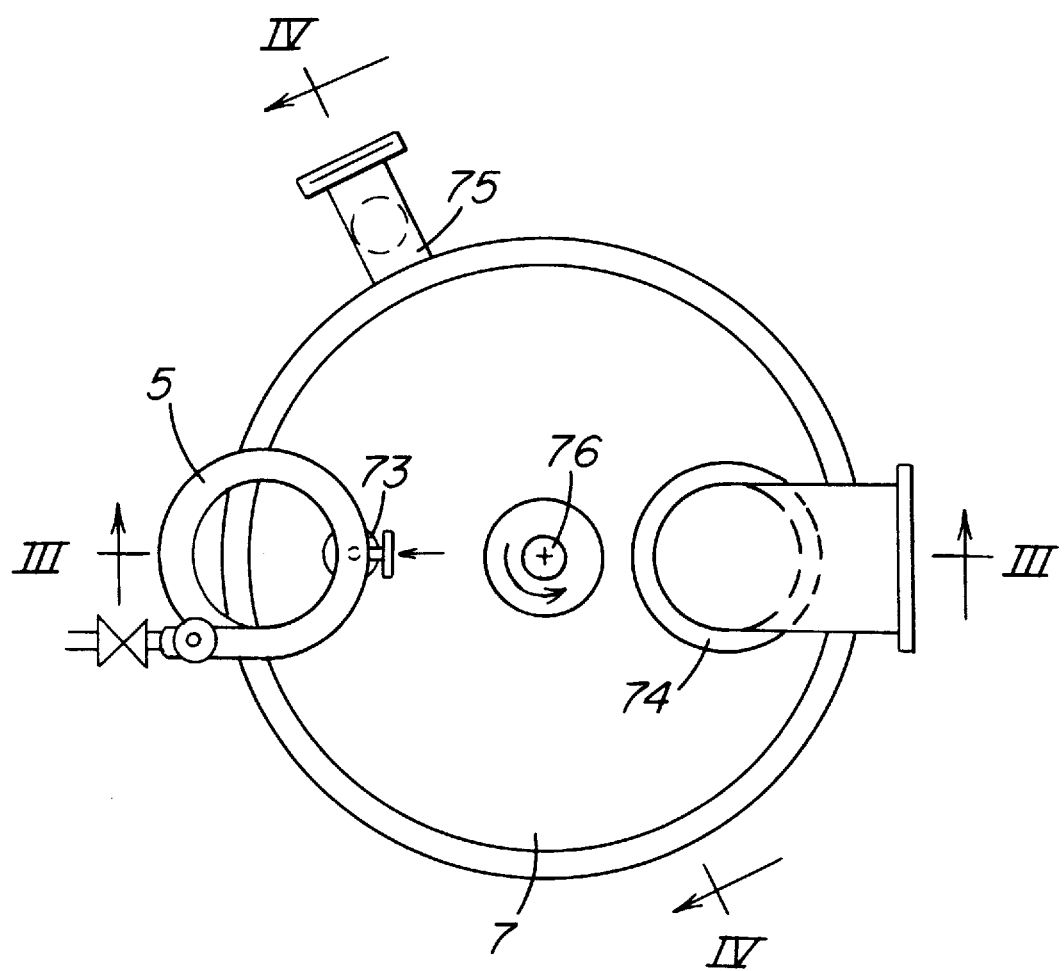
FIG. 2 shows a top view of the device according to the invention.
Figure 3:
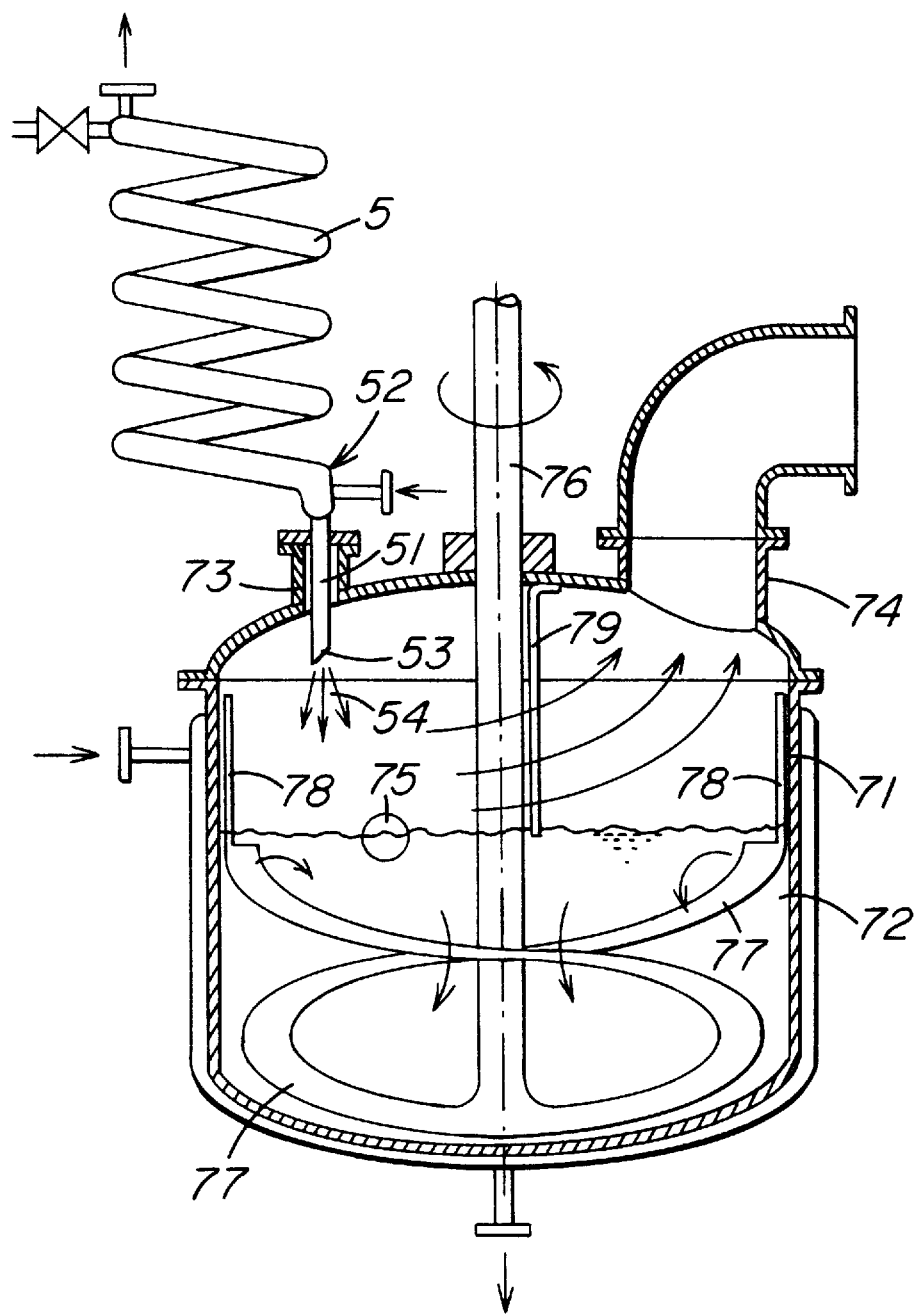
FIG. 3 shows the section III—III through the device in accordance with FIG. 2.
Figure 4:
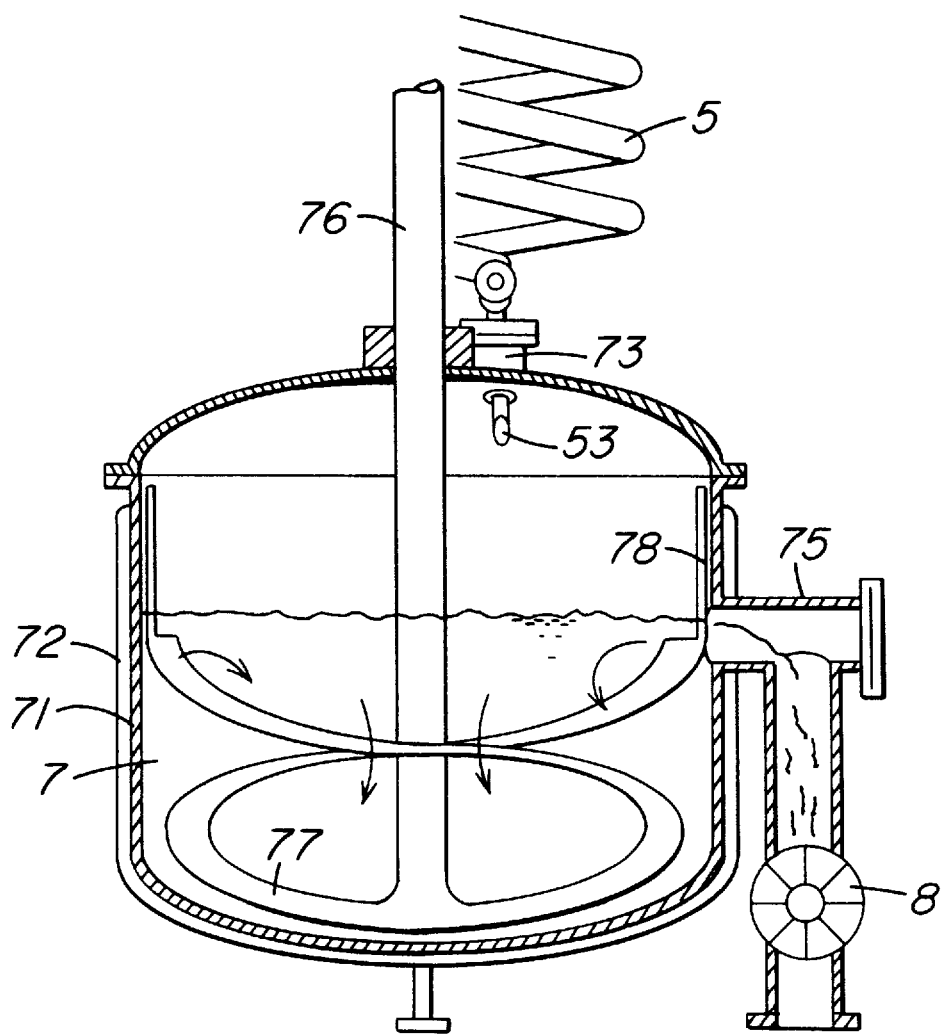
FIG. 4 shows the section IV—IV through the device in accordance with FIG. 2.

The invention is illustrated in more detail in FIGS. 2 to 4. Separating tank 7 comprises a cylindrical container 71 with a heating jacket 72 and has an inlet flanged connector 73 for a multiphase coil 5, a gas withdrawal flanged connector 74 and a solids discharge flanged connector 75, which is designed as an overflow. The stirrer shaft 76, with stirrer arms 77 which extend to the walls, is operated by a drive device which is not shown. The stirrer arms 77 are completely covered by the bed consisting of an already produced dry substance. To increase the operating lifetime of the separating tank, both wall-scrapers 78, which project above the bed and are firmly connected to the ends of the stirrer arms 77, and a scraper 79 for the shaft 76, which is connected to the wall of the tank, may also be provided. The multiphase coil 5 comprises the actual evaporating tube 51 and a heating jacket 52. The outlet 53 from the multiphase coil 5 is situated at such a height inside the gas chamber of separating tank 7 that the gas jet 54 emerging at high speed, with which the largely evaporated viscous substance is carried along, does not disturb the surface of the bed of dry material too much. Additionally, the jet does not sufficiently spread out for significant amounts of the viscous substance to be sprayed against the wall of the tank.

As shown in the figures, stirrer arms 77 and their direction of rotation are designed so that the particles in the stirred bed at the wall of the tank 71 are both transported upwards and also subjected to a rotational movement about the stirrer arm shaft 76. The discharge point 75 for the solid particles, as shown in FIG. 2, is preferably arranged so that the solid particles, after they have been sprayed from the viscous substance emerging from outlet 53 of the coil 5, cover the longest possible pathway in the separating tank 7. Furthermore, the outlet 53 of the coil 5 and the gas vent 74 are arranged opposite each other, with respect to a vertical plane through separating tank 7. The cross-section of flow in the gas space in the context of the invention, is regarded as the vertical plane through the gas space in separating tank 7, corresponding to approximately the diameter of the separating tank multiplied by the height of the gas space.

Figure 5:
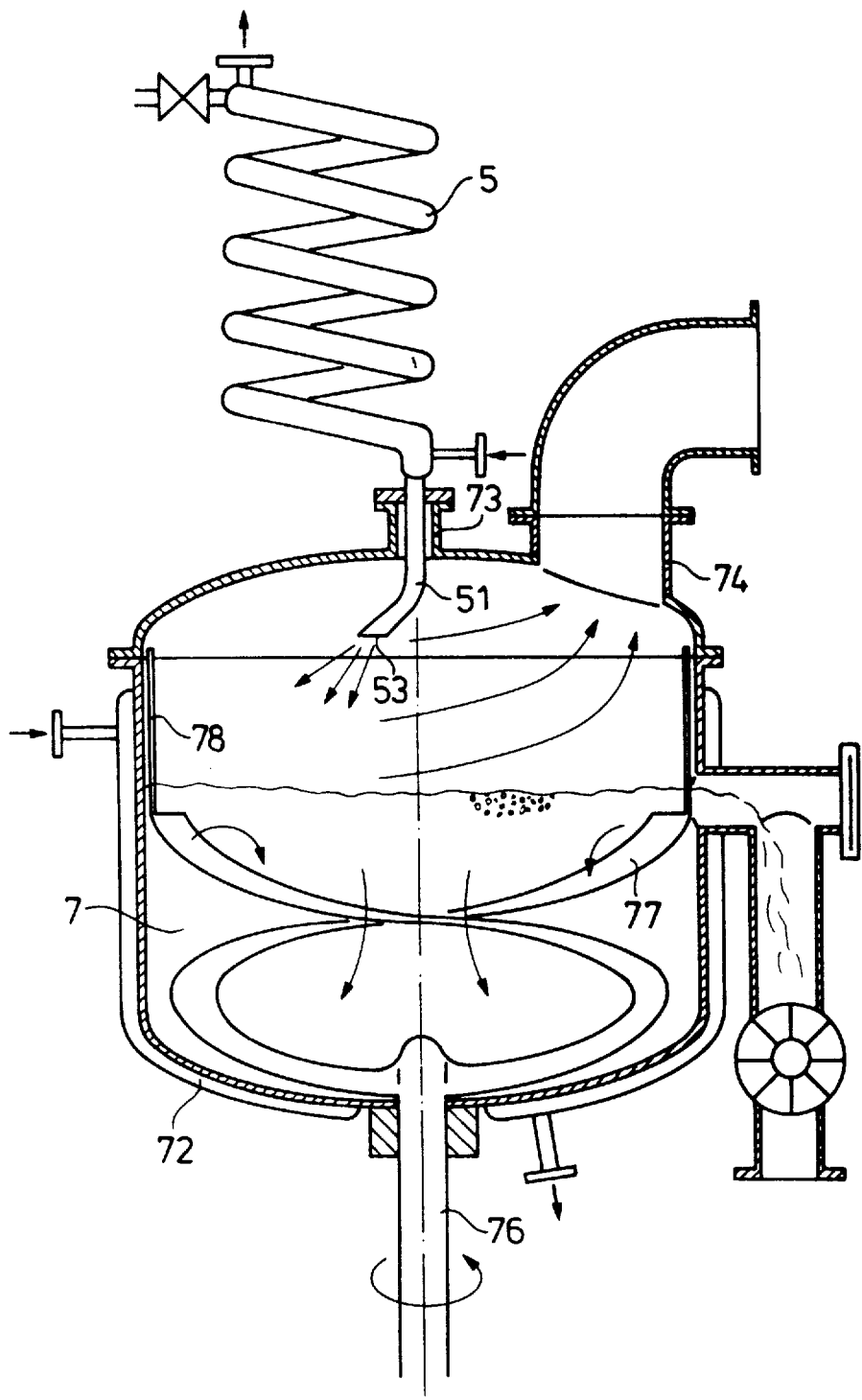
FIG. 5 shows a vertical section through an alternative device according to the present invention.

A particularly preferred embodiment of the present invention is shown in FIG. 5. Here, the shaft 76 of the stirrer is inserted into the reactor from below so that the surface of the stirred bed is not constricted by the shaft 76 passing through the stirred bed in accordance with FIG. 3. The coil 5 preferably has a bend shortly before the outlet 53 so that separation of gas and fluid phases takes place due to the centrifugal force at the outlet.

Granules of dry substance with particle sizes between 3 and 10 mm diameter are obtained according to the present invention. Agglomerations of several granule particles produced by adhesion with the viscous material are broken up again in the stirred bed. Finely divided particles which are produced, e.g., by abrasion, collect at the bottom of the bed so that they are not discharged. If such particles reach the surface due to the motion of the bed, they cake together with larger particles.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous conversion of a fluid liquid substance into a solid substance comprising:

a) increasing the viscosity of said liquid substance in a multiphase coil in a first stage in the presence of a gas phase wherein said multiphase coil has a cross section area with a high speed cross sectional flow;

b) converting said liquid substance into a solid substance and isolating said gas phase in a second stage wherein following discharge from the multiphase coil into a container, said liquid substance is applied to a stirred bed comprising a solid granular material, a gas space above said stirred bed having a cross section area wherein the cross-sectional flow is at least 200 times larger than said cross sectional flow of said coil; and c) withdrawing said gas phase and said solid substance separately from said gas space and said bed, respectively.

2. A process according to claim 1, wherein the volume of said stirred bed is at least 30% of said solid substance produced per hour.

3. A process according to claim 1, wherein said coil comprises an outlet, wherein said discharge from said multiphase coil enters into said container, wherein the direction of flow of said discharge differs from the direction of flow of said gas phase from said gas space to a gas vent located on said container.

4. A process according to claim 1, wherein said solid granular material is the same material as said solid substance produced by said process.

5. A process according to claim 1, wherein a fluid liquid substance, comprising either an evaporating solution or suspension, can be converted into a solid substance at elevated temperatures, wherein said coil and said bed are heated.

6. A process according to claim 1, wherein a pressure of less than 1 bar is maintained in said gas phase over said stirred bed.

7. A device for the continuous conversion of a fluid liquid substance into a solid substance comprising a multiphase coil opening directly into a stirred container, wherein said stirred container comprises at least one stirrer arm, said container having a diameter at least 20 times larger than that of said coil, a means for continuously discharging a solid phase while maintaining a depth of a solid bed wherein said bed covers said at least one stirrer arm located within said container and a gas space remaining above said bed which has a cross section of flow at least 200 times that of said coil, and a gas vent separated from a solids discharge point.

8. A device according to claim 7, wherein said at least one stirrer arms in said stirred container are designed to extend to the wall of said container.

9. A device according to claim 7, wherein said coil comprises an outlet, wherein the axis of said outlet from said coil in the direction of discharge, has a directional component opposite to that of the direction of the gas flow to the gas vent.

10. A device according to claim 7, wherein said stirred container has a scraper on its internal surface above said bed.

* * * * *